No. 780,627. Patented January 24, 1905.

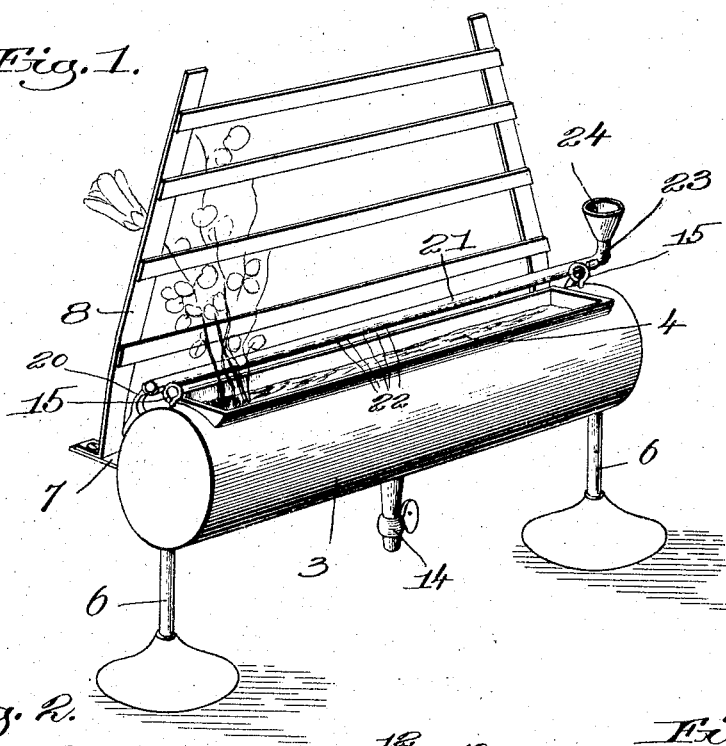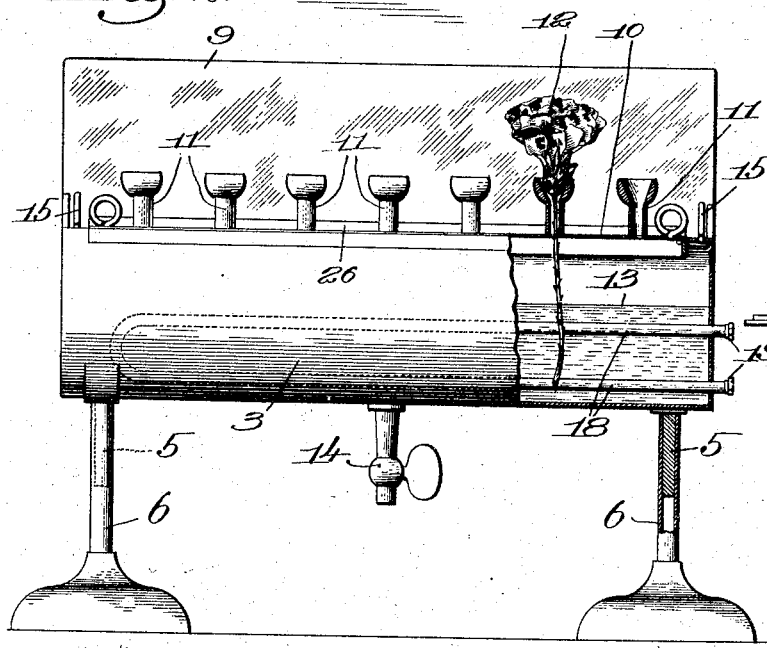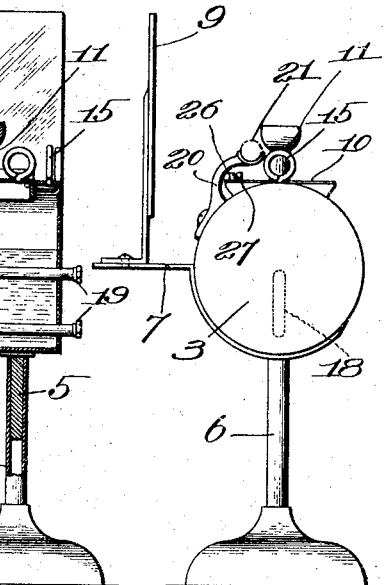

UNITED STATES PATENT OFFICE.

JACOB UMBEHEND, OF CAMBRIDGE, MASSACHUSETTS.

HORTICULTURAL APPARATUS.

SPECIFICATION forming part of Letters Patent No. 780,627, dated January 24, 1905.

Application filed November 4, 1904. Serial No. 231,329.

*To all whom it may concern:*

Be it known that I, JACOB UMBEHEND, a citizen of the United States, residing at Cambridge, county of Middlesex, State of Massachusetts, have invented an Improvement in Horticultural Apparatus, of which the following description, in connection with the accompanying drawings, is a specification, like numerals on the drawings representing like parts.

The object of my present invention is to provide a novel device in which flowers may be either grown or exhibited.

Said device comprises a receptacle adapted to contain either earth or water and having an opening in its top and a cover for said opening provided with a plurality of tubular flower-holding members. The receptacle is also provided with lateral arms which are adapted to support either a trellis-work or a mirror.

If the device is to be used to grow flowers in, the receptacle is filled with earth and the cover removed, said receptacle then operating as a large flower-pot. If the flowers to be grown in the receptacle need a trellis-work to support them, such trellis-work can be detachably secured to the arms.

The device may also be used to exhibit cut flowers in horticultural shows by merely filling the receptacle with water and applying the cover thereto and then inserting the flowers to be exhibited in the tubular flower-holding members, the stems of the flowers passing down through the tubular holding members into the water. When used in this way, I propose to substitute a mirror for the trellis-work, so that the mirror will form the background for the flowers being exhibited.

Referring to the drawings, Figure 1 is a perspective view of my improved device when used as a flower-pot. Fig. 2 is a front view thereof when used to exhibit cut flowers. Fig. 3 is an end view of Fig. 2.

The device comprises a receptacle 3, which may have any suitable shape or contour, but is preferably an elongated cylindrical receptacle which has an opening 4 in its upper side. Said receptacle has pins 5 depending therefrom which enter tubular legs 6, on which the receptacle is supported. Extending laterally from the receptacle are two or more arms 7, on which either a trellis-work 8 or mirror 9 may be supported, according to the use to which the device is to be put. As illustrated in Fig. 1, the receptacle is filled with earth in which flowers of any description are growing, said flowers being supported by the trellis-work 8.

For adapting my improved device for receiving and exhibiting cut flowers I provide a cover 10 of a shape to fit and close the opening 4, said covering having extending upwardly therefrom a plurality of tubular flower-holding members 11. When thus used to exhibit cut flowers—as, for instance, in horticultural shows—the stems of the flowers 12 to be exhibited are inserted in the tubular flower-holding members 11 and extend into the water 13, with which the receptacle 3 is filled. When used in this way, I propose to place a mirror 9 on the arms 7, as above described, said mirror making a pleasing background for the exhibited flowers.

18 designates a coil of piping located within the receptacle 3, the ends 19 of said piping extending beyond the receptacle for attachment to a steam or hot-water heating system. By this means the water or the earth in the receptacle may be maintained at any desired temperature.

20 designates arms secured to the receptacle and extending above the same, and 21 is a sprinkler-pipe adapted to be supported by said arms. Said pipe is provided with a plurality of sprinkler-openings 22 and preferably will have an elbow 23 at one end, which leads to a funnel 24. This sprinkler-pipe is especially designed for use when the receptacle has growing flowers therein and is to provide a simple and expeditious way of watering the flowers. It will be noted that the operation of watering the flowers involves merely filling the funnel 24 with water.

I prefer to provide the cover 10 with a rib 26, having a groove 27 therein. The groove constitutes a holding device for labels or placards, which may be placed therein to give the name of the flowers which are exhibited in the flower-holding members.

The receptacle can be made of any size and length and when used for growing flowers is designed to take the place of the ordinary window-boxes. The device may also be made large enough to set on the lawn in front of the house, and thus constitute a portable flower-bed.

14 designates a valve by means of which the water in the receptacle may be drawn off.

15 designates eyes by means of which the receptacle may be suspended in case it is more convenient to hang it from some overhead support than to support it by legs 6.

Various changes in the construction of the parts may be made without departing from the invention.

Having fully described my invention, what I claim as new, and desire to secure by Letters Patent, is—

1. In a device of the class described, a receptacle having an opening in its upper side and adapted to be filled with material for sustaining the life of flowers, arms projecting laterally from the receptacle, and a background for the flowers supported by the arms.

2. In a device of the class described, an elongated receptacle having an elongated opening in its upper side, a cover to close said opening, said cover being provided with tubular flower-holding members, arms projecting laterally from said receptacle, and a mirror detachably secured to said arms and forming a background for the flowers supported in the flower-holding members.

3. In a device of the class described, an elongated receptacle having an elongated opening in its upper side, a cover to close said opening, tubular flower-holding members carried by said cover, a rib, as 26, having a groove therein also carried by said cover, arms projecting laterally from the receptacle, and a mirror detachably secured to said arms and forming a background for the flowers supported in said flower-holding member.

4. In a device of the class described, an elongated receptacle having an opening in its upper side, a cover to close said opening, said cover being provided with tubular flower-holding members, and a mirror carried by the receptacle and forming a background for the flowers supported in the flower-holding members.

5. In a device of the class described, a receptacle having an opening in its upper side and adapted to be filled with material for sustaining the life of flowers, and a heating-coil within the receptacle whereby the material therein may be preserved at the proper temperature, combined with a background for the flowers supported by the receptacle.

In testimony whereof I have signed my name to this specification in the presence of two subscribing witnesses.

JACOB UMBEHEND.

Witnesses:
  LOUIS C. SMITH,
  MARGARET A. DUNN.